7961X J. D. Beers,
Planing and Matching Machine.
Patented Jan. 18, 1834.
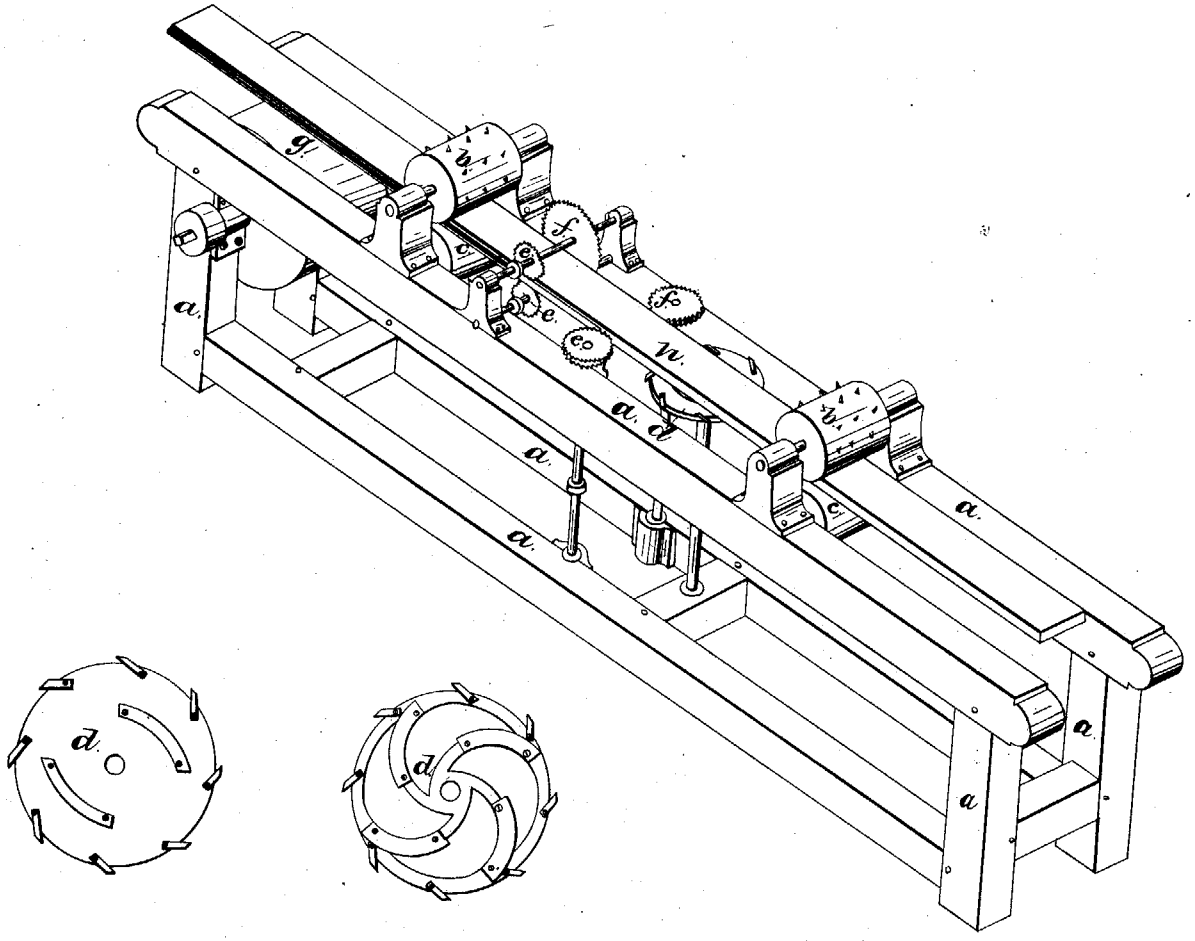
a
a
a John D. Beers, of Philadelphia, Penna.
Letters Patent
7961X The schedule referred to in these Letters Patent, and making part of the same, containing a description in the words of the said John D. Beers himself, of his improvement in the method of Tonguing, Grooving and planing boards.

---

Be it known that I, John D. Beers of the City of Philadelphia, in the State of Pennsylvania, have invented a new and useful improvement in the method of tonguing, grooving and planing boards, for flooring or other purposes, plank, timber or other material, also reducing the same to any required thickness and smoothing the surface of minerals or other substances, which is described as follows:—
The board plank or other material having been prepared by a circular saw or otherwise is placed on a stand or frame and introduced between four or more vertical wheels, the upper wheels have points projecting a little beyond their periphery which catches hold of the board and passes it in its proper position through the machine. The reducing to a thickness, and smoothing the surface of plank, boards, timber, or other material, is done by a revolving circular saw and shaving irons. The teeth of the saw are thicker than that part of the surface of the board which is to be removed. —
It is made by fastening on the top of a vertical shaft or axis an iron rim or wheel, on the top of this wheel are fastened the teeth with sunken headed bolts, projecting beyond its periphery which forms the saw. On the spokes or plate inside of the teeth are bolted two or more shaving irons either on a line from the centre or curved — with their edges projecting a little above the teeth. This saw and shavers are placed in the centre of the stand so that the board plank or other material passing over it is brought by the saw and shavers to any required thickness and also made smooth. —
The shavers or plane irons in this position have the advantage of gravity to clear them of their cuttings when the teeth of this saw are filed to form an edge on their upper surface they will finish smooth themselves —
On each side of the reducing and planing saw are revolving circular saws to form on the one side or edge of the plank or board a tongue and on the other side or edge a groove the whole length if required — To form the tongue are placed on a vertical shaft three circular saws bolted together —
The central saw is the thickness of the tongue intended to be made and double the width of the tongue less in diameter than the upper and lower saws. The upper and lower saws cut the depth in the side or edge of the board or plank that is required for the width of the tongue while the central saw finishes the edge of the tongue —
Two circular saws are also fastened on horizontal shafts or axis one above the board the other below it and set the width of the tongue from the edges of the plank or board and to cut into the carf made by the tonguing saws on the vertical shaft which finishes the tongue — on the other sides or edge of the board are one, two three or more circular saws on vertical shafts and are set three fourths their thickness above each other and are placed to cut in the edges of the board a groove the required depth and width. These saws as well as all the others are not set in the teeth when the work is required very smooth. On a horizontal shaft before or behind the grooving saws is placed a circular saw of any required thickness to trim the shoulder for the tongue to fit against —
To illustrate my invention further I refer to the drawings of the same, deposited in the patent office — What I the said John D. Beers claim as my invention is 1st The improvement and application of circular saws for tonguing grooving and trimming boards for flooring or other purposes — Plank timber or other material, also their application to finish smooth and the mode of application as herein described — 2d The application of circular saws for reducing to a thickness and planing boards, for flooring and other purposes, — plank, timber or other material and smoothing the surface of minerals or other substances also the application of planing or shaving irons in the mode and for the purposes herein described — 3d The application of wheels with points projecting beyond their periphery to move the board plank or other material in its proper position through the machine —

Witnesses
Robert Perry
John B. Perry

John D. Beers (Patented January 18. 1834)
Drawing 9 80